US012381806B2

(12) United States Patent
Chakrabarti

(10) Patent No.: US 12,381,806 B2
(45) Date of Patent: Aug. 5, 2025

(54) METHODS, SYSTEMS, AND COMPUTER READABLE MEDIA FOR TESTING INGRESS TIMESTAMPING USING LANE SKEWING

(71) Applicant: Keysight Technologies, Inc., Santa Rosa, CA (US)

(72) Inventor: Pinaki Chakrabarti, League City, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 18/386,245

(22) Filed: Nov. 1, 2023

(65) Prior Publication Data
US 2025/0080447 A1 Mar. 6, 2025

Related U.S. Application Data

(60) Provisional application No. 63/536,537, filed on Sep. 5, 2023.

(51) Int. Cl.
*H04L 12/70* (2013.01)
*H04L 43/106* (2022.01)
*H04L 43/50* (2022.01)

(52) U.S. Cl.
CPC ............ *H04L 43/50* (2013.01); *H04L 43/106* (2013.01)

(58) Field of Classification Search
CPC .............................. H04L 43/50; H04L 43/106
USPC ......................................................... 709/224
See application file for complete search history.

(56) References Cited

U.S. PATENT DOCUMENTS

| 6,031,847 | A | 2/2000 | Collins et al. |
| 6,999,891 | B2 | 2/2006 | Pepper |
| 9,094,307 | B1 | 7/2015 | Edsall et al. |
| 9,118,566 | B1 * | 8/2015 | Mendel ................. H04L 43/106 |
| 9,337,934 | B1 | 5/2016 | Agazzi et al. |
| 9,935,707 | B2 | 4/2018 | Pepper et al. |
| 10,313,100 | B2 | 6/2019 | Yim |

(Continued)

FOREIGN PATENT DOCUMENTS

JP 2011103595 A * 5/2011

OTHER PUBLICATIONS

Tim Warland, "Understanding Skew in 100GBASE-R4 applications", EE Times, pp. 1-7 (2011).

(Continued)

*Primary Examiner* — Ario Etienne
*Assistant Examiner* — Elizabeth Kassa

(57) ABSTRACT

One example method occurs at a test system implemented using at least one processor. The method includes receiving test configuration information associated with a test session for causing one or more packets to be transmitted via lanes connecting a transmitter and a receiver in a test environment; transmitting, from the transmitter and to the receiver, a first packet of the test session, wherein transmitting the first packet as data blocks and sending the data blocks via the lanes, wherein transmitting the first packet includes emulating lane skewing associated with one or more of the lanes causing at least some of the data blocks to arrive at different times; receiving a first ingress timestamp associated with the first packet; and analyzing the first ingress timestamp and a first expected ingress timestamp based on lane skew information associated with the test session.

18 Claims, 5 Drawing Sheets

(56) References Cited

U.S. PATENT DOCUMENTS

| | | | |
|---|---|---|---|
| 10,554,455 | B2 | 2/2020 | Schnizler |
| 11,265,096 | B2 | 3/2022 | Bordogna et al. |
| 11,552,871 | B2 | 1/2023 | Sela et al. |
| 11,606,157 | B1 | 3/2023 | Wasko et al. |
| 11,652,561 | B2 | 5/2023 | Leong et al. |
| 2004/0177291 | A1 | 9/2004 | Goyal et al. |
| 2005/0144342 | A1 | 6/2005 | Renaud et al. |
| 2006/0074622 | A1* | 4/2006 | Scott ............ G06F 11/3692 703/23 |
| 2007/0088991 | A1 | 4/2007 | Shin et al. |
| 2014/0269769 | A1* | 9/2014 | Gresham ............ H04L 47/34 370/474 |
| 2015/0071642 | A1 | 3/2015 | Tanaka et al. |
| 2017/0099101 | A1 | 4/2017 | Pepper et al. |
| 2019/0044637 | A1* | 2/2019 | Gulstone ............ H04J 3/067 |
| 2019/0356897 | A1* | 11/2019 | Karivaradaswamy ............ H04N 13/139 |
| 2021/0152271 | A1* | 5/2021 | Bordogna ............ H04L 1/0046 |
| 2022/0408382 | A1* | 12/2022 | Mysore ............ H04W 4/80 |
| 2024/0267317 | A1* | 8/2024 | Ameling ............ H04L 43/0829 |

OTHER PUBLICATIONS

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, pp. 1-4379, IEEE Std 802.11™-2020.

"IEEE Standard for Ethernet," IEEE Computer Society, LAN/MAN Standards Committee, pp. 1-7025, IEEE Std 802.3™-2022.

"IEEE Standard for a Precision Clock Synchronization Protocol for Networked Measurement and Control Systems," IEEE Instrumentation and Measurement Society, pp. 1-499, IEEE Std 1588™M-2019.

Calnex Solutions Ltd., "Implementing IEEE 1588v2 for use in the mobile backhaul," Technical Brief, pp. 1-24, 2009.

Chandra Mallela et al., "Timing models for PTP in Ethernet networks," IEEE Instrumentation and Measurement Soc., Keysight Technologies: Downloaded on May 26, 2023 at 01:47:28 UTC from IEEE Xplore, pp. 1-6.

Ethernet Synchronization, Keysight Technologies, Jun. 24, 2020, 7019-0048.EN pp. 1-207.

"How to Configure DP83867 SFDs," Texas Instruments Application Report—SNLA242—Oct. 2015, pp. 1-7.

"100GE and 40GE PCS Overview," Generic Architecture, Nicholl, IEEE 802.3az, Nov. 2008 Dallas, pp. 1-27.

Notice of Allowance and Fee(s) Due for U.S. Appl. No. 10/789,697 (Oct. 12, 2005).

Non-Final Office Action for U.S. Appl. No. 10/789,697 (Jul. 25, 2005).

Notice of Allowance and Fee(s) Due for U.S. Appl. No. 15/284,109 (Nov. 13, 2017).

Non-Final Office Action for U.S. Appl. No. 15/284,109 (Jul. 3, 2017).

"25 Gigabit Ethernet," Wikipedia, https://en.wikipedia.org/wiki/25_Gigabit Ethernet, accessed through wayback machine, pp. 1-3 (Oct. 2, 2016).

"25Gb Ethernet: Accelerated Network Performance and Lower Costs for Enterprise Data Center and Cloud Environments," White Paper, QLogic a Cavium Company, SN0530917-00 Rev. D, pp. 1-7 (2016).

"Enabling 100 Gigabit Ethernet Implementing PCS Lanes," Ixia, White Paper, 915-0909-01 Rev. C, pp. 1-11 (Jan. 2014).

Merritt, "Xilinx Marshals 10-Gbit serdes spec," EETimes, http://www.eetimes.com/document.asp?doc_id=1145377, pp. 1-3 (Dec. 13, 2002).

\* cited by examiner

METHODS, SYSTEMS, AND COMPUTER READABLE MEDIA FOR TESTING INGRESS TIMESTAMPING USING LANE SKEWING

PRIORITY CLAIM

This application claims the priority benefit of U.S. Provisional Patent Application Ser. No. 63/536,537, filed Sep. 5, 2023, the disclosure of which is incorporated herein by reference in its entirety.

TECHNICAL FIELD

The subject matter described herein relates to testing network elements or related behaviors. More particularly, the subject matter described herein relates to testing ingress timestamping using lane skewing.

BACKGROUND

Network devices record times of a packet's transmittal and receipt with transmit (TX) timestamping and receive (RX) timestamping. However, not all network devices perform timestamping the same or even support the same standards with regard to timestamping. In particular, there are currently multiple Institute of Electrical and Electronics Engineers (IEEE) groups which have somewhat conflicting timestamping specifications. For example, IEEE 1588-2019 defines the timestamping point as the symbol after a start of frame delimiter (SFD), whereas IEEE 802.3 defines the timestamping point as the SFD and IEEE 802.11 defines the timestamping point independent of the SFD. For other types of networks (i.e., not Ethernet or WiFi), the timestamping point is defined by other organizations. As such, some network devices may timestamp a packet on the wire depending on when different data portions of the packet are received, resulting in a lack of uniformity among network devices measuring when a packet is determined to be transmitted or received. Hence, it may be useful for a network operator to test timestamping logic or related behavior of a network device to determine whether the network device is standard-compliant or behaving as expected when timestamping packets, especially in scenarios (e.g., connections involving high-speed and/or aggregated links) where accurate timestamps are critical for network performance and/or user experience.

SUMMARY

Methods, systems, and computer readable media for testing ingress timestamping using lane skewing are disclosed. According to one method, the method occurs at a test system implemented using at least one processor. The method includes receiving test configuration information associated with a test session for causing one or more packets to be transmitted via lanes connecting a transmitter and a receiver in a test environment; transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times; receiving a first ingress timestamp associated with the first packet; analyzing the first ingress timestamp and a first expected ingress timestamp based on lane skew information associated with the test session; and generating a first test result associated with the first ingress timestamp.

According to one system, the system includes a test system implemented using a memory and at least one processor. The test system is configured for: receiving test configuration information associated with a test session for causing one or more packets to be transmitted via lanes connecting a transmitter and a receiver in a test environment; transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times; receiving a first ingress timestamp associated with the first packet; analyzing the first ingress timestamp and a first expected ingress timestamp based on lane skew information associated with the test session; and generating a first test result associated with the first ingress timestamp.

The subject matter described herein may be implemented in software in combination with hardware and/or firmware. For example, the subject matter described herein may be implemented in software executed by a processor (e.g., a hardware-based or physical processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
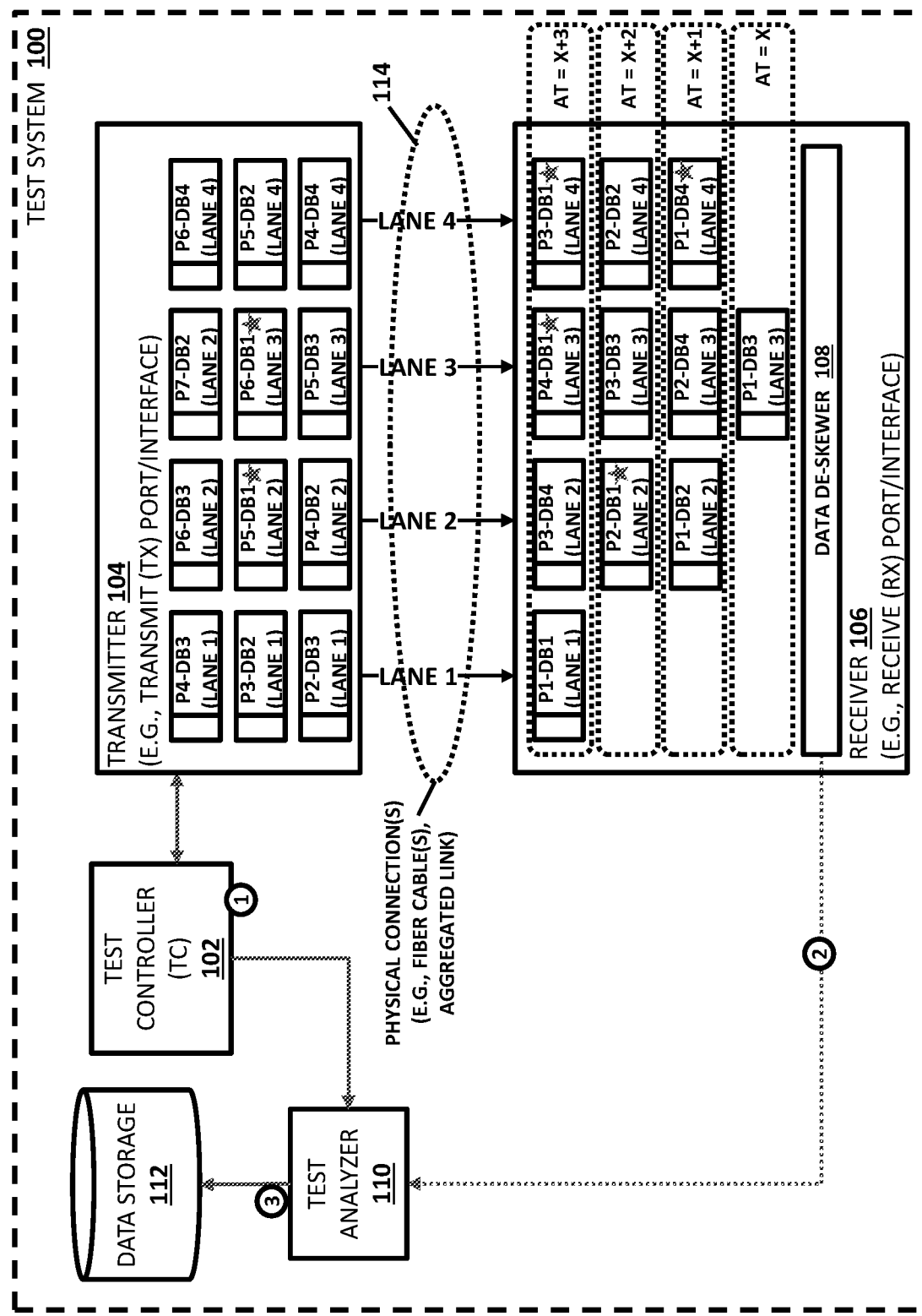
FIG. 1 is a diagram illustrating an example test system for performing a link and/or physical media qualification test.

The subject matter described herein includes methods, systems, and computer readable media for testing ingress timestamping using lane skewing. Network devices measure when they receive a packet by timestamping the packet using receive (RX) timestamping logic. Each network device may be programmed to timestamp a packet when a specific portion of the packet is received or based on other conditions. For example, where a packet is segmented into data blocks and sent via multiple lanes, a network device may determine that a packet is received based on predetermined logic which may be based on a standard or other methodology, e.g., when an initial (e.g., first-arriving) data block of a packet is received, when a data block comprising a start of frame delimiter (SFD) of the packet is received, when the last (e.g., last-arriving) data block of the packet is received, or based on other criteria.

An Ethernet SFD is an eight-bit (one-byte) value acting as an indicator denoting the end of an Ethernet preamble, the initial segment of an Ethernet packet, and signifies the start of the Ethernet frame. For example, an Ethernet SFD may disrupt the bit pattern of an Ethernet preamble and indicate the start of an Ethernet frame thereof. In binary form, an Ethernet SFD may be represented as "10101011" (0xD5 in hexadecimal, equivalent to 213 in decimal, using Ethernet's LSB first bit ordering).

Skew in data transmission may be categorized into two forms: fixed skew and dynamic skew. Fixed skew may refer to a constant difference in arrival time between signals or data blocks originating from the same source. Fixed skew may be caused by physical differences between the different lanes. Fixed skew may also be caused by RX clock/data recovery (CDR) circuits, where phase differences in local clocks can contribute to the skew. Additionally, a fiber-optic cable or transport medium itself can introduce fixed skew. Dynamic skew, or skew variation, may represent changes in skew over time and may be due to operational factors like temperature fluctuations and supply voltage variations of different lanes. Dynamic skew may also be referred to as lane-to-lane wander and may result in variations in arrival times of traversing data blocks during operation.

In the IEEE 802.3-2022 standard, section 90.7 discloses the following about how to handle lane skew when timestamping an ingress packet: "The receiver of a multi-lane PHY is expected to include a buffer to compensate for skew between the lanes. This buffer selectively delays each lane such that the lanes are aligned at the buffer output. The earliest arriving lane experiences the most delay through the buffer and the latest arriving lane experiences the least delay through the buffer. The receive path data delay for a multi-lane PHY is reported as if the beginning of the SFD arrived at the MDI input on the lane with the smallest buffer delay."

As indicated above, packet timestamping can be affected by various factors, including lane skewing in multi-lane transmission scenarios. For example, when transmitting packets, a network device may utilize an aggregated link or other multi-lane connection (e.g., a 100 gigabit (100G) interface or link utilizing four 25G serial channels or lanes) that involves segmenting packets into smaller data blocks and sending the data blocks via multiple lanes, e.g., serial channels, physical channels, physical coding sublayer (PCS) lanes, physical media attachment (PMA) or physical media dependent (PMD) lanes, separate wires or media, discrete wavelengths or wavelength ranges over a fiber cable, fiber optic channels, etc. In this example, lane skew (e.g., lanes having different latencies or delays) can affect traversal times of the data blocks.

Since lane skewing can occur in various real-world scenarios or networks and can significantly affect timestamping, a network operator may benefit from testing timestamping logic of network devices by utilizing lane skewing. However, creating lane skew by changing temperature or bending cables is not efficient and may fail to precise, reproducible results. Hence, a test system in accordance with aspects described herein may need to emulate or mimic lane skew, e.g., by adding varying delays prior to data blocks being transmitted via lanes, to efficiently test or characterize ingress or RX timestamping logic or behavior of a system under test (SUT), e.g., a network device, a network switch, a router, a network interface card (NIC), a server, etc.

In accordance with some aspects of the subject matter described herein, techniques, methods, equipment, systems, and/or mechanisms are disclosed for testing ingress timestamping using lane skewing. In some embodiments, a test system in accordance with aspects described herein may be configured for: receiving test configuration information associated with a test session for causing one or more packets to be transmitted via lanes connecting a transmitter and a receiver in a test environment; transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times; receiving a first ingress timestamp associated with the first packet; analyzing the first ingress timestamp and a first expected ingress timestamp based on lane skew information associated with the test session; and generating a first test result associated with the first ingress timestamp.

In accordance with some aspects of the subject matter described herein, a test system or an analyzer in accordance with aspects described herein may be configured for testing or verifying that a SUT is correctly implementing a standard or an expected ingress or RX timestamp methodology. For example, by emulating dynamic or variable lane skew and varying SFD lane placements when transmitting test packets (or data blocks thereof) and then analyzing ingress or RX timestamps for those test packets generated by a SUT, a test system or an analyzer may determine whether the SUT is timestamping received packets correctly or as expected during conditions that involve variable lane skew on a link.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example test system 100 for performing a link and/or physical media qualification test. Test system 100 may represent any suitable entity or entities (e.g., one or more testing platforms, nodes, or devices) associated with sending or receiving traffic (e.g., Ethernet packets or data blocks thereof). For example, test system 100 may generate and send test traffic to test one or more system(s) under test (SUT). e.g., a network device, a network switch, a router, a network interface card (NIC), a server, etc. In this example, using test traffic or related responses, test system 100 or entities thereof may analyze one or more performance aspects associated with the SUT.

In some embodiments, test system 100 may be a stand-alone tool, a testing device, a testing platform, or software executing on at least one processor. In some embodiments, test system 100 may be a single node or may be distributed across multiple computing platforms or nodes.

In some embodiments, test system 100 may include test configuration software, one or more network equipment test devices or platforms, visibility tools or modules (e.g., physical or virtual network taps), and/or test related software or agents executing on one or more processor(s).

In some embodiments, test system 100 may include one or more modules for performing various test related functions. For example, test system 100 may include a traffic engine or traffic generator for generating test traffic and/or entities that emulate network nodes or related functions.

Test system 100 may include a test controller (TC) 102, a transmitter 104, a receiver 106, a data de-skewer 108, a test analyzer 110, and/or data storage 112. In some embodiments, test system 100 may provide user interface(s) for communicating with a user (e.g., a test operator), a management entity, and/or other entities.

TC 102 may be any suitable entity or entities (e.g., software executing on a processor, an application-specific integrated circuit (ASIC), a field-programmable gate array (FPGA), or a combination of software, an ASIC, or an FPGA) for performing one or more aspects associated with instructing or controlling test execution and/or for facilitating configuration of various aspects of test system 100. In some embodiments, TC 102 may be implemented using processor(s) (e.g., a physical processor, a general purpose microprocessor, a single-core processor, a multi-core processor, an FPGA, and/or an ASIC for executing software and/or logic) and/or memory for storing data, logic, software, or other information.

In some embodiments, TC 102 may include one or more communications interfaces for interacting with users, modules, and/or nodes. For example, TC 102 may use one or more communications interfaces for receiving or sending various messages. In this example, some of the communications interfaces support automation, e.g., via one or more programming languages (e.g., python, PHP, etc.), a REST API, a command line, and/or a web-based GUI. For example, TC 102 and/or related entities may include or utilize one or more UI(s) for receiving settings and/or configuration information for setting up a test scenario or a related test session. In this example, the settings and/or configuration information may include a lane skewing configuration profile or other information (e.g., individual skew values for each lane or a range of skew variation, such as 0-20 nanoseconds (ns), for one or more lanes) usable for emulating lane skewing during a test session. In this example, after receiving user input and/or finalizing configuration information, TC 102 may send configuration instruction to set up and/or configure various test system elements, e.g., transmitter 104, receiver 106, test analyzer 110, visibility agents, etc.

Transmitter 104 may be any suitable entity (e.g., a device, a NIC, an FGPA a port module, etc.) that transmits packets via a link 114 (e.g., an aggregated or bonded link, a high-speed Ethernet fiber cable, etc.) comprising multiple lanes, e.g., PCS lanes, PDA/PMD lanes, serial or parallel channels, separate fiber optic channels, etc. For example, transmitter 104 may be a network equipment test device, a network device (e.g., a switch, a router, or a firewall), or a component of a network equipment test device or a network device. For example, in some implementation, transmitter 104 may include a line card suitable for transmitting data over a physical medium. In this example, the line card may conform to Ethernet standards, such as 100 gigabit (100G) or 400 gigabit (400G) Ethernet standards.

In some embodiments, transmitter 104 may include or interact with a traffic generator. For example, TC 102 may provide traffic definition information or other data usable for a traffic generator to generate various types of test packets during a test session.

In some embodiments, transmitter 104 may include a PCS unit for performing physical coding sublayer processing of data to be transmitted from transmitter 104 and a FEC unit for applying forward error correction to data to be transmitted from transmitter 104. In such embodiments, PCS processing performed by the PCS unit may include performing 64/66b encoding of data and adding virtual lane markers that allow receivers to de-skew the lanes and FEC processing performed by the FEC unit may involve applying error-correction coding to received data bits.

In some embodiments, transmitter 104 may include or utilize fast Ethernet transceiver chips that include physical layer transceiver circuitry (e.g., an FPGA like Xilinx Ultrascale SERDES) for connecting the Ethernet MAC layer to the physical layer. The connection between a physical layer and a MAC layer may be independent of the physical medium and may use a bus from the media independent interface family (e.g., media independent interface (MII), gigabit MII (GMII), reduced GMII (RGMII), serial GMII (SGMII), 10 GMII (XGMII)).

Receiver 106 may be any suitable entity (e.g., a device, a NIC, an FGPA a port module, etc.) that receives packets via link 114 and may include a data de-skewer 108 for buffering data blocks and/or de-skewing the data blocks. For example, receiver 106 may be a network equipment test device, a network device (e.g., a switch, a router, or a firewall), or a component of a network equipment test device or a network device. For example, in some implementation, receiver 106 may include a line card suitable for transmitting data over a physical medium. In this example, the line card may conform to Ethernet standards, such as 100 gigabit (100G) or 400 gigabit (400G) Ethernet standards.

Data de-skewer 108 may represent any suitable entity (e.g., a buffer module, logic executing on hardware, software executing on a processor, etc.) for de-skewing data blocks received via link 114. For example, data de-skewer 108 may use virtual lane markers in received data blocks to de-skew or reorder data blocks of a packet and may also convert the data blocks back into an Ethernet packet. In some embodiments, data de-skewer 108 may include or utilize a buffer for temporarily holding or buffering data blocks while waiting for all data blocks of a packet to arrive at receiver 106 and then de-skew or correct the order of the data blocks.

In some embodiments, data de-skewer 108 may reassemble a packet using the data blocks after de-skewing and then send the packet or related data (e.g., how long a data block from a particular lane was buffered, the longest amount of time a data block was buffered and the associated lane, the shortest amount of time a data block was buffered and the associated lane, etc.) to one or more destinations, e.g., an RX timestamp generator, a test analyzer 110, etc. In some embodiments, a monitoring agent may monitor data de-skewer 108, receiver 106, or other entities for obtaining various information (e.g., performance information, timing information, buffer delay information, etc.) usable by test analyzer 110 or another test system element.

Test analyzer 110 may represent any suitable entity or entities (e.g., software in addition to hardware and/or firmware) for obtaining and/or analyzing test performance information, analyzing timestamps, and/or analyzing lane skew or other delays. For example, when determining a static skew or delay associated with data transmission via link 114, test analyzer 110 may compare de-skew data from data de-skewer 108 or a monitoring agent and transmission data from transmitter 104 or data storage 112 for determining transmitter and link 114 related delay. In this example, test analyzer 110 may determine a static or inherent delay or skew associated with each lane of link 114 such that emulated lane skew (e.g., total lane skew including static and dynamic skew) can be accurately represented during a test session.

Data storage 112 may be any suitable entity or entities (e.g., a storage device, a non-transitory computer readable medium, or a storage system) for maintaining or storing information related to device emulation, lane skew emulation, network testing, expected timestamps, actual timestamps, lane skewing or variation algorithm(s), or related test analysis. For example, data storage 112 may include information for generating expected timestamps and logic for analyzing timestamps to derive or characterize timestamping logic of a SUT. Data storage 112 may also include test traffic models, test cases, test session data, topology information for test environments and/or for SUT 200, and/or other information usable for generating performance metrics (e.g., statistics) associated with one or more aspects of SUT 200. In some embodiments, data storage 112 may be located at test system 100, another node, or distributed across multiple platforms or devices.

In some embodiments, TC 102 may send instructions to configure transmitter 104 to transmit test packets via a multi-lane interface and to emulate lane skewing and adjust lane placement of SDF-containing data blocks (e.g., the lane used for sending a SDF-containing data block may change over time during a test session).

In some embodiments, test system 100 may be capable of emulating lane skew on a per-lane basis and adjusting lane placement of SDF-containing data blocks during a test session. For example, test system 100 or another entity (e.g., TC 102) may introduce static and dynamic lane skew via special processing in transmitter 104 (e.g., a test system transmit pipeline thereof), which effectively allows test system 100 to dynamically control both the magnitude of skew across each lane of link 114, as well as controlling lane placement of data blocks containing an SFD during execution of a test.

In some embodiments, by providing dynamic skew (e.g., lane-to-lane wander) support and the ability to choose or vary the lane for SDF-containing data blocks, test system 100 may test or characterize timestamping logic or related behavior of an entity, a SUT or receiver 106. For example, test system 100 can generate an expected ingress timestamp using emulated lane skew information and a known transmission time and then compare this timestamp with an actual ingress timestamp generated by receiver 106. If the expected ingress timestamp and an actual ingress timestamp match or are equal, then test system 100 or test analyzer 110 may indicate that timestamping by receiver 106 performed as expected, e.g., is compliant with a particular standard. However, if the expected ingress timestamp and the actual ingress timestamp do not match or are not equal, test system 100 or test analyzer 110 may indicate that timestamping by receiver 106 did not perform as expected, e.g., is not compliant with a particular standard.

In some embodiments, e.g., prior to testing timestamping logic or related behavior of a SUT, test system 100 may perform a link and/or physical media qualification test (also referred to herein as a transmit qualification test), e.g., when in a link/physical media qualification mode. For example, as depicted in FIG. 1, a transmit qualification test may occur prior to testing a SUT and start at step 1.

As depicted in FIG. 1, when performing a transmit qualification test, transmitter 104 may segment or divide packet 'P1' into four data blocks, e.g., "P1-DB1", "P1-DB2", "P1-DB3", and "P1-DB4", where data block 'P1-DB4' includes the SFD of packet 'P1', depicted as a star symbol. After segmentation, each of these data blocks may be transmitted at the same time from a different lane of link 114. Because of delays in the transmission path (e.g., static lane skew), all four data blocks of packet 'P1' may not be received by receiver 106 at the same time. As shown in FIG. 1, data block 'P1-DB3' on lane 3 may arrive first at some arrival time (AT=X), data blocks 'P1-DB2' and SDF-containing data block 'P1-DB4' on lane 2 and 4, respectively, may arrive later at a later arrival time (AT=X+1), and data block 'P1-DB1' on lane 1 may arrive last at an even later arrival time (AT=X+3).

Referring to FIG. 1, in step 1, test system 100 may cause transmitter 104 to generate and transmit lanes of test data across link 114 via multiple lane to receiver 106. In step 2, de-skewing performed by data de-skewer 108 may be monitored (e.g., by data de-skewer 108 or a monitoring agent) and reported to test analyzer 110 for analyzing and determining the delay or static skew associated with data transmission via transmitter 104 and link 114. In step 3, resulting transmit qualification test data (e.g., information indicating skew caused by transmitter 104 and link 114 or lanes thereof) may be stored in data storage 112 for subsequent usage.

It will be appreciated that FIG. 1 is for illustrative purposes and that various nodes and/or modules, locations, and/or functionality described above in relation to FIG. 1 may be changed, altered, added, or removed.

Figure 2:
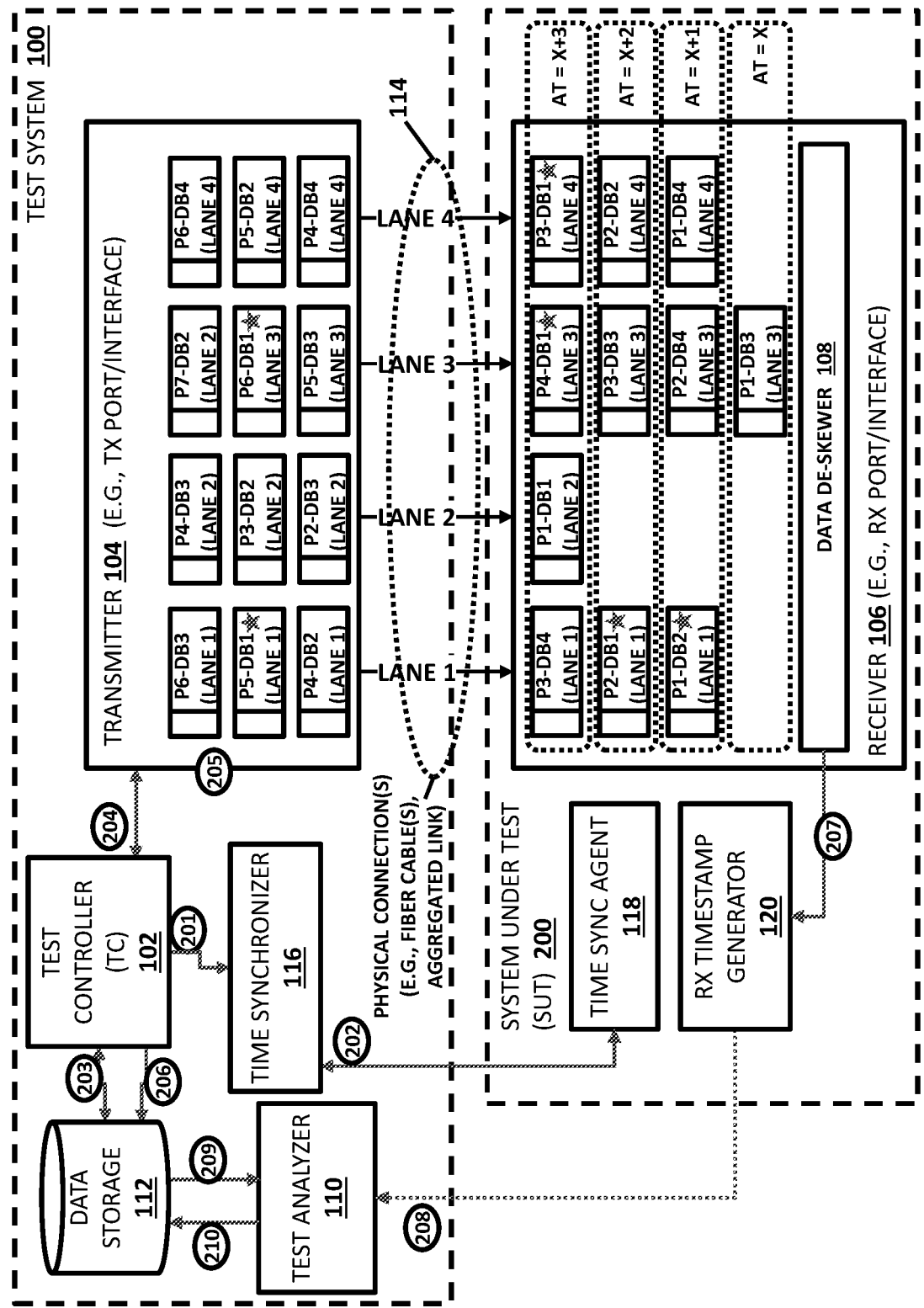
FIG. 2 is a diagram illustrating an example test system for testing ingress timestamping using lane skewing.

FIG. 2 is a diagram illustrating test system 100 for testing ingress timestamping using lane skewing. In some embodiments, test system 100 may test or characterize timestamping logic or behavior of SUT 200, e.g., a network switch, a router, a server, a NIC, a port module, etc. In such embodiments, clocks at test system 100 and SUT 200 may be synched, e.g., using a precision time protocol or another mechanism. For example, a time synchronizer 116 of test system 100 may represent a suitable entity (e.g., a module or software executing on a processor) for controlling or managing time synchronization between a leader clock at test system 100 (or an entity thereof) and one or more follower clocks at SUT 200. In this example, a time sync agent 118 may represent a suitable entity (e.g., a module or software executing on a processor) for interacting with time synchronizer 116 and for causing one or more clocks at SUT 200 to synchronize with a leader clock associated with test system 100. Continuing with this example, time sync agent 118 may be software deployed on SUT 200 (e.g., by TC 102 or another entity) and/or may include a PTP client or another client for performing time synchronization functions.

In some embodiments, test system 100 may be configured for performing a test session that involves sending test packets to SUT 200 via lanes of link 114 (e.g., a high-speed Ethernet link), where transmitter 104 is configured to emulate lane skewing (e.g., by delaying data blocks prior to transmission on one or more lanes). In such embodiments, the emulated lane skewing may be performed, for example, using a predetermined lane skewing configuration profile(s) or an lane skewing algorithm specified for a test session, e.g., lane skewing values or extent may change during the test session.

In some embodiments, a lane skewing configuration profile(s) or an lane skewing algorithm may cause data blocks of a given packet to be delayed by certain amounts depending on a lane used for transmission. For example, for one test packet or at a particular point in time during a test session, data blocks that are to traverse lane 1 are delayed by 10 ns, while data blocks that are to traverse lane 2 are delayed by 2 ns. In this example, for another test packet or at a different point in time during the test session, data blocks that are to traverse lane 1 are not delayed, while data blocks that are to traverse lane 2 are delayed by 5 ns.

In some embodiments, a lane skewing configuration profile(s) or an lane skewing algorithm may also cause SFD-containing data blocks to be assigned lanes in a predetermined manner or in a pseudo-random manner. For example, during a test session, a data block containing an SFD for a first test packet may traverse lane 1, another data block containing an SFD for a second test packet may traverse lane 2, and another data block containing an SFD for a third test packet may traverse lane 3.

In some embodiments, e.g., prior to step 201 of FIG. 2, a TX qualification process (e.g., as described in FIG. 1, may be performed to identify and/or characterize static skew or delay associated with transmitter 104 and link 114. In such embodiments, this known or determined skew may be usable by test system 100 when testing timestamping logic or related behavior of SUT 200. For example, assuming a lane skewing configuration profile indicates that lane 1 should have 10 ns of total skew and assuming a static skew for lane 1 is 5 ns, TC 102 or another entity may configure transmitter 104 to delay data blocks that are to traverse lane 1 by an additional 5 ns such that the total skew for lane 1 is 10 ns.

As depicted in FIG. 2, when sending test traffic to receiver 106 of SUT 200, transmitter 104 may segment or divide packet 'P1' into four data blocks, e.g., "P1-DB1", "P1-DB2", "P1-DB3", and "P1-DB4", where data block 'P1-DB2' includes the SFD of packet 'P1', depicted as a star symbol. After segmentation, each of these data blocks may be transmitted at the same time from a different lane of link 114. Because of delays in the transmission path (e.g., static lane skew) and/or emulated lane skew (e.g., dynamic lane skew added by transmitter 104), all four data blocks of packet 'P1' may not be received by receiver 106 of SUT 200 at the same time. As shown in FIG. 2, data block 'P1-DB3' on lane 3 may arrive first at some arrival time (AT=X), SDF-containing data block 'P1-DB2' and data block 'P1-DB4' on lane 1 and 4, respectively, may arrive at a later arrival time (AT=X+1), and data block 'P1-DB1' on lane 2 may arrive last at an even later arrival time (AT=X+3).

In some embodiments, test analyzer 110 may analyze actual ingress timestamps generated at SUT 200 (e.g., by RX timestamp generator 120) and expected ingress timestamps generated by TC 102 or another entity to determine whether the timestamping logic or related behavior of SUT 200 is expected, e.g., by determining if the two timestamps match.

By convention, the arrival time of an Ethernet packet may generally be determined with respect to receipt or detection of an SFD of the packet. In accordance with a first standard or timestamping methodology, for cases where link aggregation or bonding is used (e.g., an 100Gb Ethernet link comprising four independent 25Gb Ethernet links), the arrival time of an Ethernet packet may be reported as if the beginning of the SFD for the packet arrived at SUT 200 on the lane with the smallest buffer delay, e.g., as if the SFD was in the last arriving data block. As such, if this standard was used by SUT 200 for timestamping, then RX timestamp generator 120 may generate an ingress timestamp for packet 'P1' corresponding to when data block 'P1-DB1' arrived on lane 2 (regardless that the SDF-containing data block 'P1-DB2' arrived earlier on lane 1).

In accordance with a second standard or timestamping methodology, for cases where link aggregation or bonding is used, the arrival time of an Ethernet packet may be reported as if the beginning of the SFD for the packet arrived at SUT 200 on the lane with the largest buffer delay, e.g., as if the SFD was in the first arriving block. As such, if this standard was used by SUT 200 for timestamping, then RX timestamp generator 120 may generate an ingress timestamp for packet 'P1' corresponding to when data block 'P1-DB3' arrived on lane 1 (regardless that the SDF-containing data block 'P1-DB2' arrived later on lane 1).

Referring to FIG. 2, a test session for testing and/or characterizing timestamping logic or related behavior of SUT 200 is depicted and starts at step 201.

In step 201, TC 102 may instruct time synchronizer 116 to synchronize clocks with SUT 200.

In step 202, time synchronizer 116 and time sync agent 118 may communicate via PTP or another mechanism such that clocks at test system 100 and SUT 200 are synchronized. For example, after time synchronization, the clocks at time synchronizer 116 and time sync agent 118 are synchronized including the clock used by RX timestamp generator 120 in generating timestamps.

In step 203, a test case definition or test configuration information associated with a test session may be accessed by TC 102 from data storage 112. In some embodiments, test case definition or test configuration information may include lane skewing configuration information or instructions (e.g., a lane skewing configuration profile) for emulating lane skewing during the test session.

In step 204, TC 102 may instruct or configure transmitter 104 (e.g., an 100GBASE-R4 interface) to skew lanes in an accordance with test configuration information or a related lane skewing configuration profile.

In step 205, transmitter 104 may be instructed to place an SFD of a first Ethernet packet in a data block positioned or assigned for transmission via a predetermined lane (e.g., lane 4).

In step 206, TC 102 or another entity may generate and store an expected RX timestamp for the first Ethernet packet using lane skewing information and SFD placement. For example, an expected RX timestamp for a given packet may be generated in accordance with a particular standard or based on the expected behavior of SUT 200 or RX timestamp generator 120 thereof and may involve estimating the timestamp (e.g., generated by RX timestamp generator 120) for that packet when it is received at receiver 106 of SUT 200.

In step 207, after the first Ethernet packet is segmented into data blocks and the data blocks are transmitted via lanes of link 114 from transmitter 104 and received by receiver 106, the data blocks may be de-skewed by data de-skewer 108 and an RX timestamp may be generated by RX timestamp generator 120.

In some embodiments, RX timestamp generator 120 may be software or logic executed on SUT 200 or receiver 106 and may be programmed to timestamp packets based on one or more rules and/or in accordance with a standard.

For example, RX timestamp generator 120 may be compliant with the IEEE 802.3-2022 standard and may generate a timestamp for a packet as if the beginning of an SFD of the packet arrived at receiver 106 on the lane with the smallest buffer delay. In this example, assuming lane 1 is associated with the smallest buffer delay at receiver 106 (e.g., because lane 1 has the highest skew of lanes of link 114), if a data block of the packet arrives at receiver 106 via lane 1 at May 21, 2023, 16:09:19.753692627 UTC and another data block containing the SDF of the packet arrives at receiver 106 via lane 4 at May 21, 2023, 16:09:19.753692622 UTC, then the RX timestamp for the packet may be equal to the time that the data block arrived at receiver 106 via lane 1, i.e., May 21, 2023, 16:09:19.753692627 UTC.

In another example, RX timestamp generator 120 may be non-compliant with the IEEE 802.3-2022 standard and may generate a timestamp for a packet as if the beginning of an SFD of the packet arrived at receiver 106 on the lane with the largest buffer delay. In this example, assuming lane 3 is associated with the largest buffer delay at receiver 106 (e.g., because lane 3 has the least skew of lanes of link 114), if a data block of the packet arrives at receiver 106 via lane 3 at May 21, 2023, 16:09:19.753692621 UTC and another data block containing the SDF of the packet arrives at receiver 106 via lane 4 at May 21, 2023, 16:09:19.753692622 UTC, then the RX timestamp for the packet may be equal to the time that the data block arrived at receiver 106 via lane 3, i.e., May 21, 2023, 16:09:19.753692621 UTC.

In step 208, the RX timestamp generated by RX timestamp generator 120 and/or related information associated with the first Ethernet packet (e.g., arrival times associated with individual data blocks of the first Ethernet packet) may be communicated to or obtained by test analyzer 110.

In step 209, after obtaining the expected RX timestamp for the first Ethernet packet from data storage 112, test analyzer 110 may analyze or compare the expected RX timestamp for the first Ethernet packet and the RX timestamp generated by RX timestamp generator 120.

In some embodiments, timestamp analysis information or related results associated with comparing an expected RX timestamp and an actual RX timestamp may be usable for indicating whether SUT 200 or RX timestamp generator 120 behaved as expected. For example, if an expected RX timestamp and an actual RX timestamp matched or were equal, then the results may indicate that SUT 200 or RX timestamp generator 120 behaved as expected, e.g., compliant with a particular standard. However, in this example, if the expected RX timestamp and the actual RX timestamp did not matched match or were different, then the results may indicate that SUT 200 or RX timestamp generator 120 did not behave as expected, e.g., not compliant with a particular standard.

In some embodiments, timestamp analysis information or related results may indicate a timestamping behavior of SUT 200 or RX timestamp generator 120. For example, using known transmission times and configuration information along with information from SUT 200, test analyzer 110 may determine or derive how an actual timestamp was generated by RX timestamp generator 120 and may indicate how or why it deviated from an expected behavior (e.g., a supposedly supported standard).

In some embodiments, test analyzer 110 may need to analyze RX timestamps generated by SUT 200 or RX timestamp generator 120 during a test session to accurately characterize whether SUT 200 or RX timestamp generator 120 is performing ingress or RX timestamping as expected or pursuant to a standard. For example, by dynamically skewing lanes by varying amounts and changing which lane is used for transmitting SDF-containing data blocks, test system 100 or a related entity can confirm that the correct timestamp is applied for each test packet (e.g., test analyzer 110 can confirm the timestamping logic is not based on a static lane or the lane that the SFD-containing data block traverses.

In step 210, timestamp analysis information or related results may be logged or reported. For example, test analyzer 110 may store results in data storage 112 and/or provide results in a test report via a GUI or other interface.

It will be appreciated that FIG. 2 is for illustrative purposes and that various functionality described above in relation to FIG. 2 may be changed, altered, added, or removed.

Figure 3:
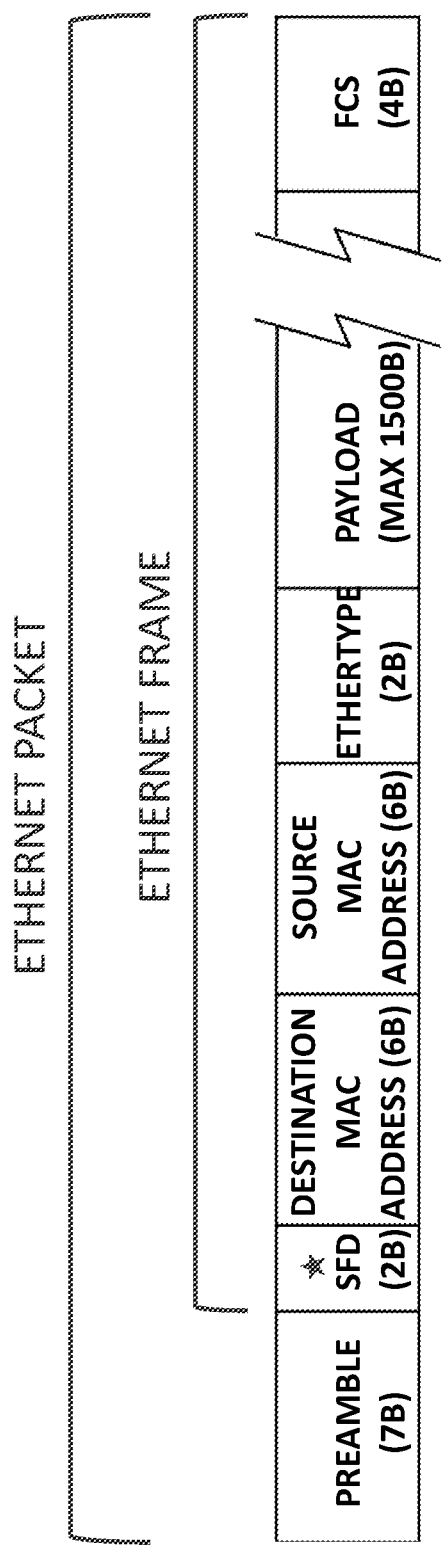
FIG. 3 is a block diagram illustrating an example Ethernet packet.

FIG. 3 is a block diagram illustrating an example Ethernet packet 300, also referred to herein as packet 300. Packet 300 may include a preamble including seven bytes (e.g., octets) of data followed by the SFD including one byte. For example, the preamble may comprise a 56-bit (e.g., seven-byte or seven-octet) pattern of alternating 1 and 0 bits, allowing devices on the network to easily synchronize their receiver clocks, thereby providing bit-level synchronization. The preamble may be followed by the SFD to provide byte-level synchronization and to mark a new incoming frame. For Ethernet variants transmitting serial bits instead of larger symbols, the (uncoded) on-the-wire bit pattern for the preamble portion and the SFD portion of the frame may be represented as "10101010 10101010 10101010 10101010 10101010 10101010 10101010 10101011" in binary format.

As depicted in FIG. 3, an Ethernet frame begins after the SFD, which forms the remainder of packet 300. The frame includes a six-byte receiver media access control (MAC) address and a six-byte sender MAC address identifying unique addresses for the destination and source of the packet 300, respectively. In some embodiments, packet 300 may include an optional virtual local area network (VLAN) tag of four bytes, e.g., if packet 300 is traveling to or from a port handling more than one VLAN. Packet 300 may further include two bytes identifying a Ethertype field (also referred to as a type or size field) followed by a payload with a maximum length of 1500 bytes. A Ethernet payload may include a padding field of variable length to ensure a minimum length of the payload or frame. Packet 300 may include a frame check sequence (e.g., cyclic redundancy check (CRC) checksum) of four bytes to detect accidental changes to the transmitted data. In some embodiments, packet 300 may have a maximum length of 2000 bytes.

It will be appreciated that FIG. 3 is for illustrative purposes and that various data or fields described above in relation to packet 300 may be changed, altered, added, or removed.

Figure 4:
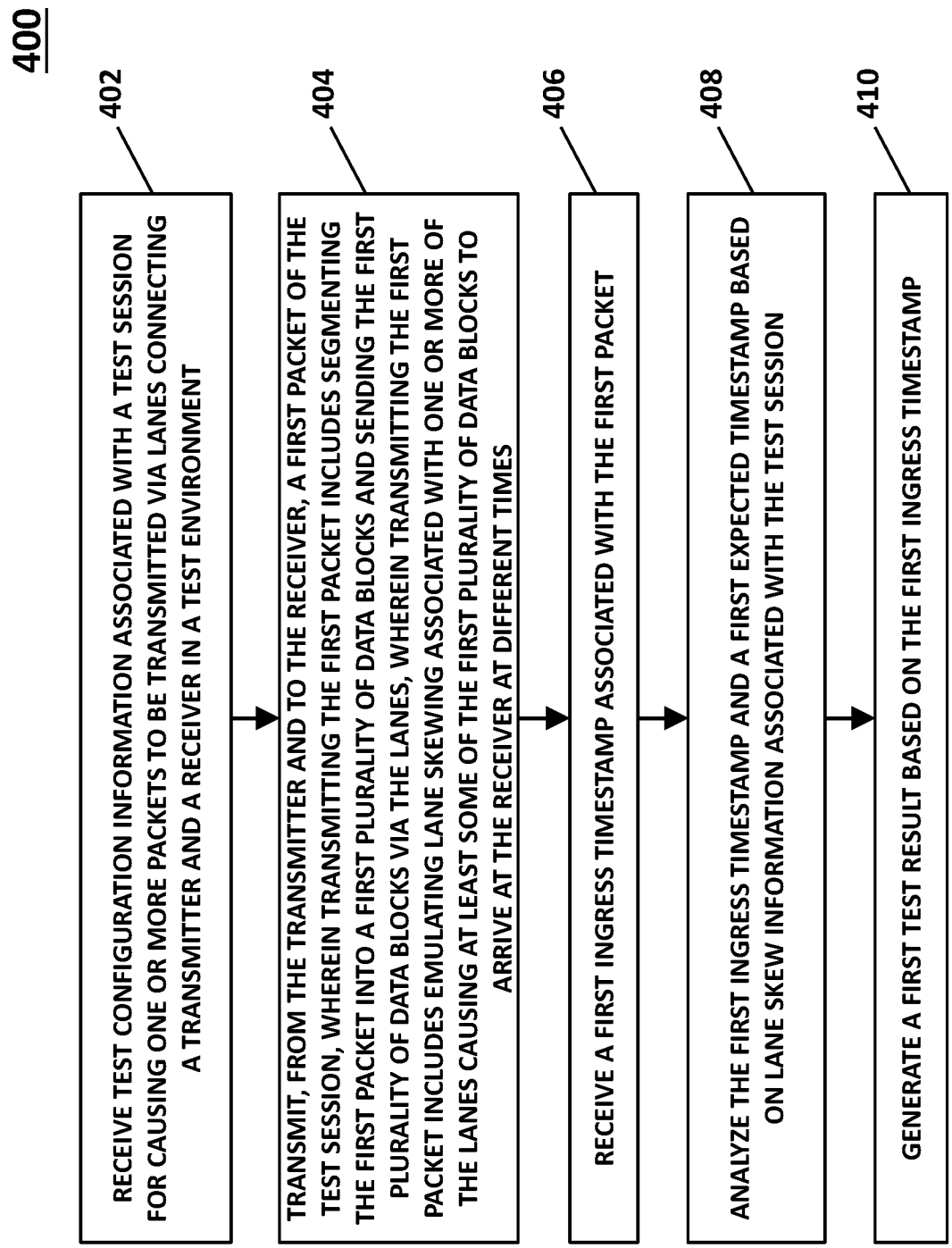
FIG. 4 is a block diagram illustrating an example process for testing ingress timestamping using lane skewing.

FIG. 4 is a block diagram illustrating an example process 400 for testing ingress timestamping using lane skewing. In some embodiments, process 400 may include steps 402, 404, 406, 408, and/or 410. In some embodiments, process 400, or portions thereof, may be performed by test system 100, a test system entity, software or logic executing on a processor, and/or another node or module.

Referring to process 400, in step 402, test configuration information associated with a test session may be received for causing one or more packets to be transmitted via lanes (e.g., of link 114) connecting a transmitter (e.g., transmitter 104) and a receiver (e.g., receiver 106) in a test environment. For example, a test system user may provide input to test system 100 or another entity (e.g., TC 102) for configuring a test environment and/or a test session for testing ingress timestamping at SUT 200. In this example, the input may indicate that dynamic lane skewing should occur during testing and that lane placement of SFD-containing data blocks (and/or other data blocks) may also change (e.g., dynamically or periodically).

In some embodiments, test configuration information may include lane skewing configuration information for emulating lane skewing during the test session.

In some embodiments, each lane (e.g., of link 114) may include a PCS lane, a serial channel, or a physical channel.

In step 404, a first packet of the test session may be transmitted from the transmitter and to the receiver, where transmitting the first packet includes segmenting the first packet into a first plurality of data blocks and sending the first plurality of data blocks via the lanes and where transmitting the first packet includes emulating lane skewing associated with one or more of the lanes causing at least some of the first plurality of data blocks to arrive at the receiver at different times. For example, TC 102 may configure or instruct transmitter 104 to emulate dynamic lane skew when sending test traffic. In this example, the emulated lane skew may involve delaying some data blocks of an Ethernet packet that are to traverse one lane (e.g., lane 1) to receiver 106 longer than other data blocks of the Ethernet packet that are to traverse one or more other lane (e.g., lanes 2-4).

In step 406, a first ingress timestamp associated with the first packet may be received. For example, SUT 200 or RX timestamp generator 120 may compute an ingress timestamp for a received packet (e.g., by receiver 106).

In step 408, the first ingress timestamp and a first expected ingress timestamp based on lane skew information associated with the test session may be analyzed. For example, test analyzer 110 may compare an actual ingress timestamp (e.g., generated by SUT 200) and an expected ingress timestamp (e.g., generated by test system 100) and may use results from the comparison to determine whether receiver 106 is timestamping as expected and/or to characterize the timestamping logic of receiver 106.

In some embodiments, lane skew information (e.g., used in generating an expected ingress timestamp) may indicate that a first lane (e.g., lane 1) of the lanes of link 114 has the least buffer delay (e.g., at data de-skewer 108) and that a first data block comprising a first SFD of the first packet traverses a second lane (e.g., lane 4) of the lanes.

In step 410, a first test result associated with the first ingress timestamp may be generated. For example, test analyzer 110 may store result information indicating whether an actual ingress timestamp (e.g., generated by SUT 200) and an expected ingress timestamp (e.g., generated by test system 100) are the same or different. In this example, the result information may also indicate a reason or a possible reason for any difference or unexpected behavior (e.g., SUT 200 may be using an inappropriate lane or using a predetermined or static lane regardless of buffer delay).

In some embodiments, a first test result (e.g., generated using an actual first timestamp and an expected first timestamp) may indicate whether the first ingress timestamp for a first packet is generated using timing information associated with the lane having the least buffer delay of the lanes of link 114 regardless of which lane of the lanes of link 114 a first data block comprising a first SFD of the first packet traverses.

In some embodiments, during a test session involving transmitting data blocks via a plurality of lanes from a transmitter to a receiver in a test environment and prior to transmitting a second packet of the test session: modifying the test environment including modifying an emulated lane skewing configuration for one or more of the lanes such that a different lane of the lanes has the least buffer delay of the lanes than when a first packet was transmitted; transmitting, from the transmitter and to the receiver, the second packet of the test session, wherein transmitting the second packet may include segmenting the second packet into a second plurality of data blocks and sending the second plurality of data blocks via the lanes, wherein transmitting the second packet may include emulating lane skewing using the modified emulated lane skewing configuration and causing at least some of the second plurality of data blocks to arrive at the receiver at different times; receiving a second ingress timestamp associated with the second packet; and analyzing the second ingress timestamp and a second expected ingress timestamp based on updated lane skew information associated with the test session; and generating a second test result associated with the second ingress timestamp.

In some embodiments, modifying an emulated lane skewing configuration may include modifying the emulated lane skewing configuration to cause a second data block comprising a second SFD for a second packet to traverse a different lane than a first data block comprising a first SFD for a first packet, e.g., lane 4 instead of lane 2. For example, in accordance with a lane skewing configuration profile or a lane skewing algorithm, test system 100 or related entities may adjust emulated skews of different lanes during a test session and may also change which lane receives SDF-containing data blocks. In this example, the skewing and SDF lane placement may be periodic or aperiodic, e.g., changes or adjustments may be based on time, packet counts, network conditions or emulated network conditions, and/or other criteria.

In some embodiments, updated lane skew information may indicate that a second lane (e.g., lane 3) of a plurality of lanes has the least buffer delay of the plurality of lanes and that a second data block comprising a second SFD of a second packet traverses a first lane (e.g., lane 2) of the plurality of lanes.

In some embodiments, a second test result (e.g., generated using an actual first timestamp and an expected first timestamp) may indicate whether a second ingress timestamp for a second packet is generated using timing information associated with a lane having the least buffer delay of the lanes of link 114 regardless of which lane of the lanes of link 114 a second data block comprising a second SFD of the second packet traverses.

In some embodiments, test system 100 may perform a transmit qualification test for determining transmit port delay and/or physical media delay prior to executing a test session, e.g., prior to performing process 400. For example, test system 100 may determine a static or inherent delay or skew associated with each lane of link 114 such that emulated lane skew (e.g., total lane skew including static and dynamic skew) can be accurately represented during a test session.

It will be appreciated that process 400 is for illustrative purposes and that different and/or additional actions may be used. It will also be appreciated that various actions described herein may occur in a different order or sequence.

Figure 5:
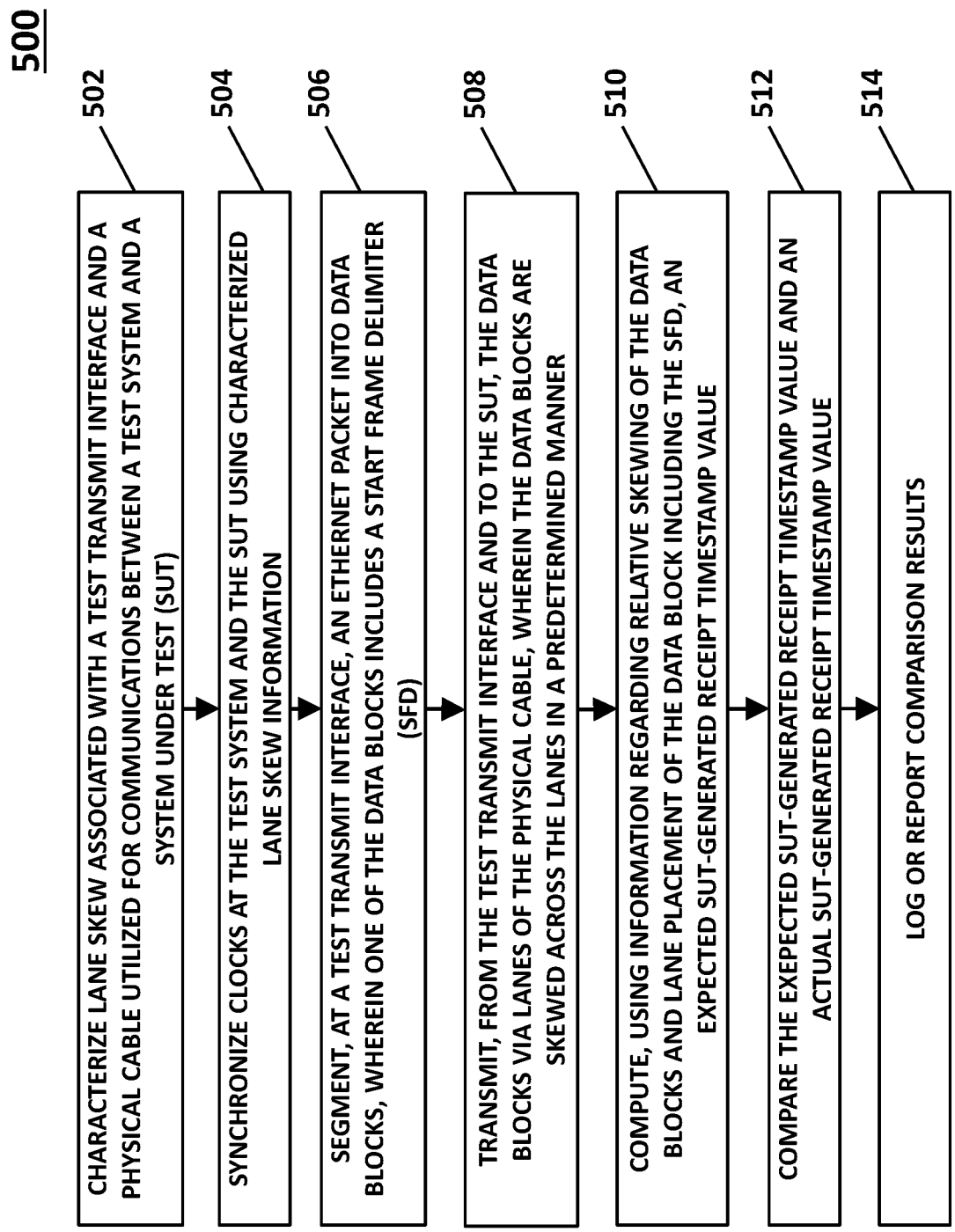
FIG. 5 is a block diagram illustrating another example process for testing ingress timestamping using lane skewing.

FIG. 5 is a block diagram illustrating another example process 500 for testing ingress timestamping using lane skewing. In some embodiments, process 500 may include steps 502, 504, 506, 508, 510, 512, and/or 514. In some embodiments, process 500, or portions thereof, may be performed by test system 100, a test system entity, software or logic executing on a processor, and/or another node or module.

Referring to process 500, in step 502, lane skew associated with a test transmit interface (e.g., transmitter 104) and a physical cable (e.g., link 114, an Ethernet cable, a fiber cable, etc.) utilized for communications between test system 100 and SUT 200. For example, test system 100 may be configured to perform test in a link/physical media qualification mode (e.g., as depicted in FIG. 1) and may determine skew (e.g., delays) caused by transmitter 104 and a connected physical cable. In this example, the skew information may be stored and then used for subsequent testing or other purposes, e.g., when a test system user wants to emulate skew for one or more lanes, test system 100 or a related entity (e.g., TC 102) may add skew in light of the known skew to match or attempt to match the user-requested skew.

In step 504, clocks at test system 100 and SUT 200 may be synchronized using characterized lane skew. For example, after determining actual lane skew during a link/physical media qualification mode, test system 100 or another entity (e.g., time synchronizer 116 and time sync agent 118) may use a precision time protocol (PTP) or another mechanism to synchronize clocks at test system 100 and SUT 200.

In step 506, an Ethernet packet (e.g., a test packet) may be segmented into data blocks at the test transmit interface (e.g., transmitter 104), where one of the data blocks includes an SFD. For example, an Ethernet packet of 1500 bytes may be segmented into four data blocks of 375 bytes. In this example, the first data block of the four data blocks may include an Ethernet preamble and an SFD.

In step 508, the data blocks may be transmitted, from the test transmit interface (e.g., transmitter 104) and to SUT 200, via lanes of the physical cable, where the data blocks are skewed across lanes in a predetermined manner. For example, transmitter 104 may be configured (e.g., by test system 100 or TC 102) to skew or delay data blocks that are traverse one or more lanes of an Ethernet cable or link connecting test system 100 and SUT 200 according to a lane skew configuration provided by or influenced by user input.

In step 510, an expected SUT-generated receipt or RX timestamp may be computed using information regarding relative skewing of the data blocks and lane placement of the data block including the SFD. For example, test system 100 or another entity (e.g., TC 102, test analyzer 110, etc.) may know or obtain emulated lane skew values for each lane used in transmitting data blocks of a test packet (e.g., which lane has the least skew or delay associated with data block transmission) and may know or obtain which lane that the data block comprising an SFD traversed. In this example, using that information, an expected ingress or RX timestamp for the test packet at SUT 200 may be computed or estimated, e.g., TC 102 may emulate the timestamping logic used by SUT 200 (or the expected behavior thereof) and may use the test system's clock, known transmitted time(s) of one or more data blocks of the test packet, and lane skew information to computed the expected ingress or RX timestamp for the test packet at SUT 200.

In step 512, the expected SUT-generated RX timestamp and an actual SUT-generated RX timestamp may be compared or analyzed. For example, test analyzer 110 may obtain an expected timestamp from data storage 112 and an actual timestamp from SUT 200 or another entity (e.g., RX timestamp generator 120). In this example, test analyzer 110 may also obtain and use test environment data, e.g., lane skew information for a given packet or set of packets, to determine whether the actual timestamp was computed as expected, e.g., in accordance with a standard, timestamp is based on when the SFD-containing data block of the data blocks of a test packet was received, timestamp is based on when a first data block of the data blocks of the test packet was received, timestamp is based on when a last data block of the data blocks of the test packet was received, etc.

In step 514, comparison results may be logged or reported. For example, after determining that an expected SUT-generated RX timestamp and an actual SUT-generated RX timestamp were equal, test analyzer 110 may store this result and/or provide this result along with other comparison results for other test packets in a test report to a test system user. In this example, the report may indicate based on timestamps for multiple test packets whether SUT 200 performed timestamping as expected, e.g., in a standard-compliant way regardless of the emulated lane skew and SFD-containing data block lane placement.

In some embodiments, test system 100 may change lane skew values (e.g., amounts of emulated lane skew for each lane) during a test session such that the timestamping behavior of SUT 200 can be determined and/or characterized. For example, by changing lane skew between packet transmissions and lane placement of SFD-containing data blocks, test system 100 or a related entity (e.g., test analyzer 110) can determine whether SUT 200 or RX timestamp generator 120 is timestamping packets as expected, e.g., whether an RX or ingress timestamp for a packet is based on the lane with the smallest buffer delay regardless of which lane an SFD of the packet traversed.

In some embodiments, test system 100 may perform lane skew dynamically or on-the-fly during a test session (e.g., to simulate temperature effect or bending of cable) and may verify or determine how those changes affect ingress or RX timestamping at SUT 200. In such embodiments, test system 100 or a related entity (e.g., test analyzer 110) may use test results in determining how well SUT 200 or data de-skewer 108 adjusts the delay of a lane, or selects or uses the appropriate lane (e.g., the lane associated with the smallest buffer delay) for timestamping.

In some embodiments, test system 100 may change the lane used in transmitting SFD-containing data blocks during a test session and may verify or determine how those changes affect ingress or RX timestamping at SUT 200, e.g., determine whether SUT 200 or RX timestamp generator 120 uses the appropriate lane (e.g., the lane associated with the smallest buffer delay) for timestamping regardless of which lane(s) SFD-containing data blocks are traversing.

It will be appreciated that process 500 is for illustrative purposes and that different and/or additional actions may be used. It will also be appreciated that various actions described herein may occur in a different order or sequence.

It should be noted that test system 100 and/or various modules, nodes, or functionality described herein may constitute a special purpose computing platform, device, or system. Further, test system 100 and/or functionality described herein can improve the technological field of testing timestamping logic or behavior of network devices or other equipment. For example, by emulating lane skew and dynamically changing lane placement of SFD-containing data blocks, an example test system can effectively test ingress or RX timestamping logic or behavior of SUT 200 or another entity.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing ingress timestamping using lane skewing, the method comprising:
    at a test system implemented using at least one processor:
        receiving test configuration information associated with a test session for causing one or more packets to be transmitted via lanes connecting a transmitter and a receiver in a test environment;
        transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times due to different amounts of emulated lane skew;

receiving a first ingress timestamp associated with the first packet;

determining, based on the emulated lane skew, a first expected ingress timestamp for the first packet;

analyzing the first ingress timestamp and the first expected ingress timestamp to determine whether the first ingress timestamp matches the first expected ingress timestamp;

generating a first test result associated with the first ingress timestamp;

during the test session and prior to transmitting a second packet of the test session:

modifying the test environment including modifying an emulated lane skewing configuration for one or more of the lanes such that a different lane of the lanes has the least buffer delay of the lanes than when the first packet was transmitted;

transmitting, from the transmitter and to the receiver, the second packet of the test session, wherein transmitting the second packet includes segmenting the second packet into a second plurality of data blocks and sending the second plurality of data blocks via the lanes, wherein transmitting the second packet includes emulating lane skewing using the modified emulated lane skewing configuration and causing at least some of the second plurality of data blocks to arrive at the receiver at different times;

receiving a second ingress timestamp associated with the second packet:

analyzing the second ingress timestamp and a second expected ingress timestamp based on updated lane skew information associated with the test session; and generating a second test result associated with the second ingress timestamp.

2. The method of claim 1 wherein each of the lanes includes a physical coding sublayer (PCS) lane, a serial channel, or a physical channel.

3. The method of claim 1 wherein the lane skew information indicates that a first lane of the lanes has the least buffer delay of the lanes and that a first data block comprising a first start of frame delimiter of the first packet traverses a second lane of the lanes.

4. The method of claim 1 wherein the first test result indicates whether the first ingress timestamp is generated using timing information associated with the lane having the least buffer delay of the lanes regardless of which lane of the lanes a first data block comprising a first start of frame delimiter of the first packet traverses.

5. The method of claim 1 wherein the test configuration information includes lane skewing configuration information for emulating lane skewing during the test session.

6. The method of claim 1 wherein modifying the emulated lane skewing configuration includes modifying the emulated lane skewing configuration to cause a second data block comprising a second start of frame delimiter for the second packet to traverse a different lane than a first data block comprising a first start of frame delimiter for the first packet.

7. The method of claim 1 wherein the lane skew information indicates that a second lane of the lanes has the least buffer delay of the lanes and that a second data block comprising a second start of frame delimiter of the second packet traverses a first lane of the lanes.

8. The method of claim 1 wherein the second test result indicates whether the second ingress timestamp is generated using timing information associated with the lane having the least buffer delay of the lanes regardless of which lane of the lanes a second data block comprising a second start of frame delimiter of the second packet traverses.

9. A test system for testing ingress timestamping using lane skewing, the system comprising:

a memory; and at least one processor, wherein the test system is configured for:

receiving test configuration information associated with a test session for causing one or more packets to be transmitted via lanes connecting a transmitter and a receiver in a test environment;

transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times due to different amounts of emulated lane skew;

receiving a first ingress timestamp associated with the first packet;

determining, based on the emulated lane skew, a first expected ingress timestamp for the first packet;

analyzing the first ingress timestamp and the first expected ingress timestamp to determine whether the first ingress timestamp matches the first expected ingress timestamp;

generating a first test result associated with the first ingress timestamp;

during the test session and prior to transmitting a second packet of the test session:

modifying the test environment including modifying an emulated lane skewing configuration for one or more of the lanes such that a different lane of the lanes has the least buffer delay of the lanes than when the first packet was transmitted;

transmitting, from the transmitter and to the receiver, the second packet of the test session, wherein transmitting the second packet includes segmenting the second packet into a second plurality of data blocks and sending the second plurality of data blocks via the lanes, wherein transmitting the second packet includes emulating lane skewing using the modified emulated lane skewing configuration and causing at least some of the second plurality of data blocks to arrive at the receiver at different times;

receiving a second ingress timestamp associated with the second packet;

analyzing the second ingress timestamp and a second expected ingress timestamp based on updated lane skew information associated with the test session; and generating a second test result associated with the second ingress timestamp.

10. The test system of claim 9 wherein each of the lanes includes a physical coding sublayer (PCS) lane, a serial channel, or a physical channel.

11. The test system of claim 9 wherein the lane skew information indicates that a first lane of the lanes has the least buffer delay of the lanes and that a first data block comprising a first start of frame delimiter of the first packet traverses a second lane of the lanes.

12. The test system of claim 9 wherein the first test result indicates whether the first ingress timestamp is generated using timing information associated with the lane having the least buffer delay of the lanes regardless of which lane of the lanes a first data block comprising a first start of frame delimiter of the first packet traverses.

13. The test system of claim 9 wherein the test configuration information includes lane skewing configuration information for emulating lane skewing during the test session.

14. The test system of claim 9 wherein the test system performs a transmit qualification test for determining transmit port delay and/or physical media delay prior to executing the test session.

15. The test system of claim 9 wherein the test system is configured for modifying the emulated lane skewing configuration to cause a second data block comprising a second start of frame delimiter for the second packet to traverse a different lane than a first data block comprising a first start of frame delimiter for the first packet.

16. The test system of claim 9 wherein the lane skew information indicates that a second lane of the lanes has the least buffer delay of the lanes and that a second data block comprising a second start of frame delimiter of the second packet traverses a first lane of the lanes.

17. The test system of claim 9 wherein the second test result indicates whether the second ingress timestamp is generated using timing information associated with the lane having the least buffer delay of the lanes regardless of which lane of the lanes a second data block comprising a second start of frame delimiter of the second packet traverses.

18. A non-transitory computer readable medium comprising computer executable instructions embodied in the non-transitory computer readable medium that when executed by at least one processor of a test system perform steps comprising:

receiving test configuration information associated with a test session for causing one or more packets to be transmitted via lanes connecting a transmitter and a receiver in a test environment;

transmitting, from the transmitter and to the receiver, a first packet of the test session, wherein transmitting the first packet includes segmenting the first packet into a first plurality of data blocks and sending the first plurality of data blocks via the lanes, wherein transmitting the first packet includes emulating lane skewing associated with one or more of the lanes causing at least some of the first plurality of data blocks to arrive at the receiver at different times due to different amounts of emulated lane skew;

receiving a first ingress timestamp associated with the first packet;

determining, based on the emulated lane skew, a first expected ingress timestamp for the first packet;

analyzing the first ingress timestamp and the first expected ingress timestamp to determine whether the first ingress timestamp matches the first expected ingress timestamp;

generating a first test result associated with the first ingress timestamp;

during the test session and prior to transmitting a second packet of the test session:

modifying the test environment including modifying an emulated lane skewing configuration for one or more of the lanes such that a different lane of the lanes has the least buffer delay of the lanes than when the first packet was transmitted;

transmitting, from the transmitter and to the receiver, the second packet of the test session, wherein transmitting the second packet includes segmenting the second packet into a second plurality of data blocks and sending the second plurality of data blocks via the lanes, wherein transmitting the second packet includes emulating lane skewing using the modified emulated lane skewing configuration and causing at least some of the second plurality of data blocks to arrive at the receiver at different times;

receiving a second ingress timestamp associated with the second packet;

analyzing the second ingress timestamp and a second expected ingress timestamp based on updated lane skew information associated with the test session; and generating a second test result associated with the second ingress timestamp.

* * * * *